H. E. DINWIDDIE.
MANURE SPREADER.
APPLICATION FILED JUNE 26, 1911.
1,023,302.
Patented Apr. 16, 1912.
2 SHEETS—SHEET 2.
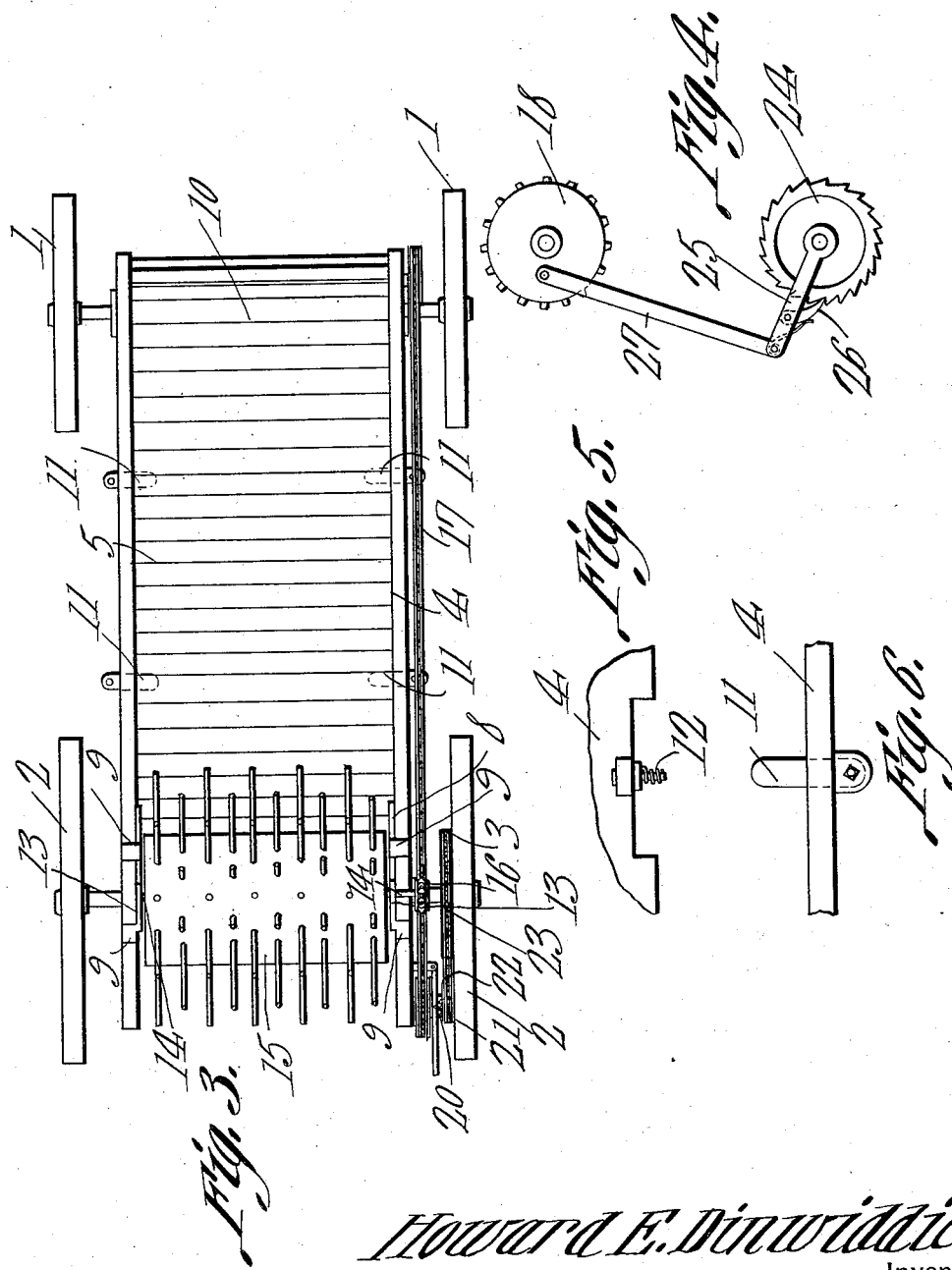

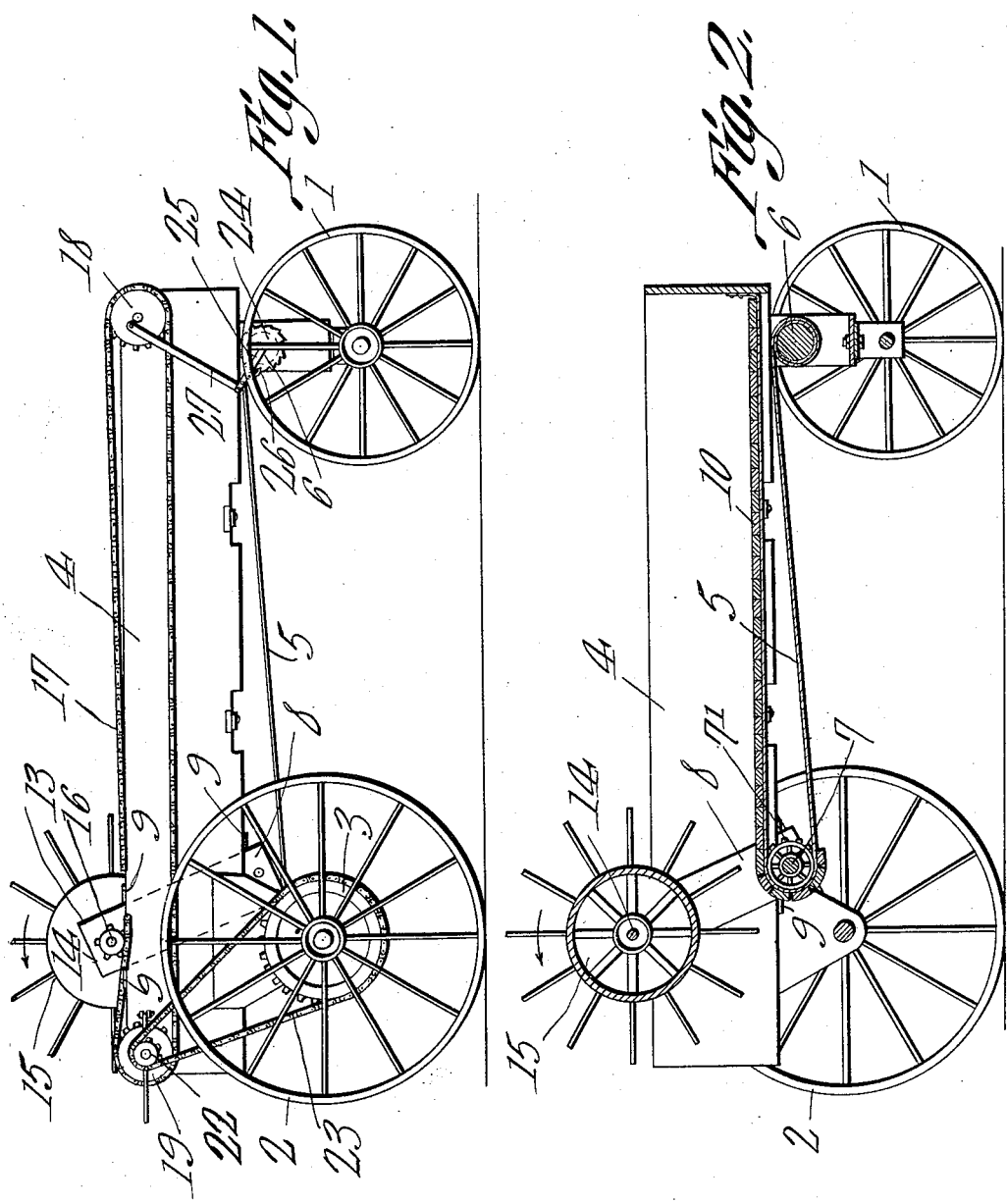

UNITED STATES PATENT OFFICE.

HOWARD E. DINWIDDIE, OF ONAWA, IOWA.

MANURE-SPREADER.

1,023,302.  Specification of Letters Patent.  Patented Apr. 16, 1912.

Application filed June 26, 1911. Serial No. 635,330.

*To all whom it may concern:*

Be it known that I, HOWARD E. DINWIDDIE, a citizen of the United States, residing at Onawa, in the county of Monona and State of Iowa, have invented a new and useful Manure-Spreader, of which the following is a specification.

This invention relates to manure spreaders, its principal object being to provide a spreading or distributing cylinder which is bodily shiftable toward the load, the bottom of the wagon body being made up of an apron adapted to be wound as the manure is removed therefrom.

Manure spreaders as heretofore constructed have had means for shifting the load toward the spreading cylinder, this obviously requiring the expenditure of considerable power in addition to that required for operating the spreading cylinder.

The object of the present invention is, as hereinbefore stated, to support the load upon a structure which can be gradually shortened, the spreading cylinder being shiftable in the direction of the load during this operation, thus requiring the expenditure of but a little more power than that necessary to rotate the cylinder.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

In said drawings:—Figure 1 is a side elevation of the machine. Fig. 2 is a central vertical longitudinal section therethrough. Fig. 3 is a plan view. Fig. 4 is an enlarged detail view of the mechanism employed for transmitting motion to the winding roller. Fig. 5 is an enlarged elevation of a portion of one side of the body. Fig. 6 is a plan view of the parts shown in Fig. 5.

Referring to the figures by characters of reference 1 and 2 designate the front and rear supporting wheels, one of the rear supporting wheels having a drive sprocket 3. A wagon box 4 is carried by the wheels and is open at the rear end thereof, the bottom of the box being normally closed by a belt 5 secured at one end to the front end of the wagon body and at its other end to a roller 6 journaled under the front portion of the wagon body or box. A shaft 7 having sprockets 7' is journaled in slides 8 mounted on the inner faces of the sides of the box 4, these slides being formed with top and bottom flanges 9 adapted to travel along the upper and lower edges respectively of the sides of the box 4. The belt or apron 5 extends partly around the shaft 7 and sprockets 7' and, when said shaft is between the rear end portions of the sides of the box 4, the apron 5 is held taut, that portion of the apron located above the roller 6 and shaft 7 being covered with slats 10. Fingers 11 may be pivotally connected to the sides of the box 4 and extended under the side portions of the apron so as to prevent it from sagging, each of these fingers being preferably provided with a spring 12 whereby it is held normally at right angles to the side of the box.

The slides 8 have standards 13 upstanding therefrom and in which are journaled the trunnions 14 of a spreading cylinder 15. This cylinder is constantly spaced a short distance from the shaft 7 and the apron thereon and one of the trunnions 14 has a sprocket 16 secured to it. This sprocket constantly engages an endless chain 17 extending along one side of the box 4 and mounted on sprockets 18 and 19 arranged at one side of the box and adjacent the front and rear ends thereof. Sprocket 19 is provided with a shiftable clutch member 20 adapted to be moved into engagement with a clutch member 21 carried by a smaller sprocket 22 and which receive motion through a chain 23 from the sprocket 3 hereinbefore referred to.

Roller 6 has a ratchet wheel 24 connected to one of its trunnions and a lever 25 is fulcrumed upon said trunnion and carries a pawl 26 which normally meshes with the ratchet wheel. A pitman 27 connects the lever to the wheel 18 so that, as said wheel rotates, lever 25 will be oscillated and an intermittent rotation imparted to the ratchet wheel 24 and the roller 6.

When it is desired to use the machine, the slides 8 are drawn toward the rear ends of the sides of the box 4, this causing the apron 5 to unwind from the roller 6, it being understood that the pawl 26 will click back on ratchet wheel 24 during this adjustment. The manure is piled upon the slatted portion of the apron and within the box, the fingers 11 serving to prevent the apron from sagging under the weight of the load. When the machine is drawn forward chain 23 will be driven by sprocket 3 and by coupling the clutch members 20 and 21 motion will be transmitted to the sprocket 19 which, in turn, will drive the chain 17 and the sprocket 18. Sprocket 16 will thereby be rotated by the chain 17 and the cylinder 15 will engage and discharge that portion of the manure in contact therewith, throwing it over the cylinder onto the ground and spreading it. As the parts thus operate the lever 25 is oscillated and roller 6 is caused to slowly rotate intermittently. Apron 5 is therefore gradually wound upon the roller and pulls on shaft 7 which in turn causes the slides 8 to travel toward the front end of the box 4, carrying the cylinder 15 therewith. Said cylinder is thus slowly fed into the manure. The speed of rotation of the cylinder 15 is of course dependent upon the relative sizes of the sprocket wheels and the speed of movement of the slides 8 is also dependent upon the size of gear 18 relative to gear 19 and upon the throw of the lever 25.

It will be apparent that by constructing the machine in the manner set forth, less power is required to spread the manure than where the entire load is shifted bodily against the distributing cylinder. As the slides move toward the front of the box 4 they strike against the fingers 11 and push them out of the paths thereof. These fingers promptly move back to their normal positions after the slides have passed and thus continue to support the apron thereabove.

What is claimed is:—

1. A manure spreader including a receptacle for manure, said receptacle having a bottom made up of a belt of flexibly connected sections, a distributer movable toward the bulk of the manure to discharge the same from the receptacle, means for advancing said distributer relative to the receptacle, means for operating the distributer to discharge the manure, and means for causing the sections of the bottom of the receptacle to successively withdraw from the manure at the discharge end of the bulk.

2. A manure spreader including a receptacle having its bottom made up of a belt of flexibly connected sections, a spreading element movable throughout the length of the receptacle, and means for automatically shortening the bottom of the receptacle from that end thereof nearest the spreading element.

3. A manure spreader including a receptacle having a flexible bottom, a revoluble spreading element, means for gradually shortening the bottom of the receptacle and withdrawing from contact with the load the extremity of the bottom of the receptacle nearest the spreading element, and means for shifting said spreading element against the load during the shortening of said bottom.

4. A manure spreader including a receptacle having a flexible bottom, a revoluble spreading element, means for automatically shortening the bottom of the receptacle and withdrawing from contact with the load the extremity of the bottom nearest the spreading element, means for shifting the spreading element against the load, and means for rotating said element independently of said shifting movement.

5. A manure spreader including a receptacle, the bottom of said receptacle consisting of a belt of flexibly connected sections, means for successively withdrawing the sections from the discharge end of the receptacle to shorten the bottom from said end, and a distributing element actuated by said means to move longitudinally of and within the receptacle.

6. A manure spreader including a receptacle, the bottom of said receptacle consisting of a belt of flexibly connected sections, means for successively withdrawing the sections from the discharge end of the receptacle to shorten the bottom from said end, a distributing element actuated by said means to move longitudinally of and within the receptacle, and means for rotating the distributing element independently of such movement.

7. A manure spreader including a receptacle having its bottom made up of a belt of flexibly connected sections, means for winding said bottom to shorten the load supporting portion thereof, slides movable with said bottom during the adjustment thereof, a spreading element journaled between the slides, and means for rotating said element.

8. A manure spreader including a receptacle having a flexible bottom folded to form an upper load supporting portion and a lower portion, means for winding said lower portion to shorten the load supporting portion, shiftable means for supporting the bottom at the fold thereof, a spreading element having its axis fixed relative to said supporting means, and means for rotating said element irrespective of its position relative to the receptacle.

9. A manure spreader including a receptacle, said receptacle including a flexible bottom folded to form an upper load supporting portion and a lower portion, revoluble means for supporting said bottom at the fold thereof, means for winding the lower portion to shift said supporting means and shorten the load supporting portion of the bottom, a spreading element mounted movably relative to the receptacle and maintained constantly in a predetermined relation to the fold supporting means, and means for rotating said element irrespective of its position relative to the receptacle.

10. A manure spreader including a receptacle having a flexible bottom folded upon itself to form an upper load supporting portion and a lower portion, means for supporting said bottom at the fold thereof, said means being movable relative to the receptacle, means for intermittently winding the lower portion of the bottom to shift said fold supporting means, a spreading element movable with said fold supporting means, and means for rotating said spreading element.

11. A manure spreader including a receptacle having its bottom made up of a belt of flexibly connected sections, a spreading element movable longitudinally of and within the receptacle, means for automatically shortening the bottom of the receptacle from that end thereof nearest the spreading element, and means for maintaining the spreading element at a predetermined distance from the bottom during the shortening thereof.

In testimony that I claim the foregoing as my own, I have hereto affixed my signature in the presence of two witnesses.

HOWARD E. DINWIDDIE.

Witnesses:
C. F. MOCK,
H. L. MORRISON.

---

Copies of this patent may be obtained for five cents each, by addressing the "Commissioner of Patents, Washington, D. C."